United States Patent
Andreini

(10) Patent No.: US 7,069,004 B2
(45) Date of Patent: Jun. 27, 2006

(54) SYSTEM FOR MONITORING THE PERFORMANCE OF MOBILE TELEPHONY NETWORKS

(75) Inventor: Enrico Andreini, Florence (IT)

(73) Assignee: CommProve, Ltd., Dublin (IE)

( * ) Notice: Subject to any disclaimer, the term of this patent is extended or adjusted under 35 U.S.C. 154(b) by 87 days.

(21) Appl. No.: 10/333,583

(22) PCT Filed: Jul. 30, 2001

(86) PCT No.: PCT/EP01/08785

§ 371 (c)(1),
(2), (4) Date: Jan. 24, 2003

(87) PCT Pub. No.: WO02/11478

PCT Pub. Date: Feb. 7, 2002

(65) Prior Publication Data

US 2004/0203724 A1    Oct. 14, 2004

(30) Foreign Application Priority Data

Aug. 1, 2000   (IT) ............................ PI2000A0051

(51) Int. Cl.
*H04Q 7/20*  (2006.01)
*H04B 17/00* (2006.01)
*H04B 1/38*  (2006.01)

(52) U.S. Cl. .................. 455/423; 455/424; 455/67.11; 455/560

(58) Field of Classification Search ............. 455/67.11, 455/423, 424, 524, 560, 561; 370/242, 244, 370/245
See application file for complete search history.

(56) References Cited

U.S. PATENT DOCUMENTS

| 6,091,950 A | * | 7/2000 | Remy ......................... 455/423 |
| 6,236,856 B1 | * | 5/2001 | Abbadessa .................. 455/423 |
| 6,438,372 B1 | * | 8/2002 | Cadaux ....................... 455/423 |
| 6,456,845 B1 | * | 9/2002 | Drum et al. ................. 455/424 |
| 2003/0162539 A1 | * | 8/2003 | Fiut et al. .................... 455/424 |

FOREIGN PATENT DOCUMENTS

| EP | 0 902 597 | 3/1999 |
| FR | 2 772 927 | 6/1999 |
| WO | WO 98 23115 | 5/1998 |

* cited by examiner

*Primary Examiner*—Binh K. Tieu
(74) *Attorney, Agent, or Firm*—Smith, Gambrell & Russell, LLP

(57) ABSTRACT

In a system for checking performance quality of mobile telephony networks, specific electronic devices (15, 15') are connected to digital data transmission lines (13, 13', 14, 14') between base stations controllers (11, 11') and base transmitting stations (12, 12') dedicated to peripheral areas, or cells, such devices being apt to acquisition of data transmitted onto said lines and to process said data for identification of specific network operating parameters and for correlation of said parameter between them. The above electronic devices are also connected to central processing units (30) where the above processed data are periodically transmitted to for later searching and processing according to design and network maintenance requirements, or any other requirement of users connected by means of remote terminals (31) to said central units.

13 Claims, 3 Drawing Sheets

SYSTEM FOR MONITORING THE PERFORMANCE OF MOBILE TELEPHONY NETWORKS

TECHNICAL FIELD

This invention concerns a system for monitoring the radioelectrical performance of mobile telephony networks. The invention refers also to a method for monitoring the radioelectrical performance of mobile telephony networks.

STATE OF ART

As we already know, over the recent years mobile telephony networks have constantly been developing and widely spreading to cover the whole territory in a more and more efficient way.

However, proper operating of networks is very influenced just by the increasing spread of users and areas covered by the service. This is due by the fact that each call implies keeping a specific frequency engaged for supporting connection between any single telephone set and the local station dedicated to the area where such apparatus is located.

When considering the above-mentioned spread of users and growing number of telephone networks active in the same areas, one can easily understand that the consequent limit of number of frequencies available in a network causes a great increase of interference risk, that is, simultaneous use of the same frequency for two different connections regarding the same area, or geographic user cell.

Due to the territory morphologic variability, both distribution and form of cells can be very different from the ones suggested in theory and needed to guarantee their necessary separation and geographic distinction.

Really, proper techniques have been used in order to reduce the interference risk; for example, dynamic control of radio transmission power both of station and mobile set and/or interruption of transmission during pauses in calls.

These techniques, however, are useful only in case of homogeneous distribution of mobiles utilisation in the different areas, or cells.

Therefore, it is important for a mobile telephony network manager to know in real time the real distribution of traffic in the different cells of the net in order to checking the cell's dimension and planning any further expansions or integrations.

It is also important to know the quality of communications supported by the telephony network and reasons for bad working.

At present, this information is obtained by means and instruments that are more and more unadequate in parallel with network dimension and traffic increase: on the occasion, ordinary protocol analysers are used and placed in the area, or cell, under analysis, and a specific quantity of operating data transmitted onto the digital data transmission lines of the network is acquired and consequently transferred to processing units to extract any information required.

It is clear that this information is more and more limited, not adequately supported and late with respect to the real needs, and the relating acquiring procedure is expensive and entangled.

SUMMARY OF THE INVENTION

This invention aims to introduce an extremely rational and efficient system, and its relating method, for monitoring the radioelectrical performance of any mobile telephony network.

Particularly, the primary object of the invention is to provide a system allowing analysis of state of operating of any mobile telephony network in real time.

A further object of this invention is to provide a system of analysis and check on any mobile telephony network that, according to peculiar features of modularity and structural simplicity, can be fixly associated to the network under checking.

Another object of the invention is to provide a system of analysis and check of any mobile telephony network able to satisfy design, maintenance or any other requirements of network managing.

These and many other objects and advantages are obtained by a system for monitoring the radioelectrical performance of mobile telephony networks wherein specific electronic devices are connected to digital data transmission lines between base stations controllers and base transmitting stations dedicated to single peripheral areas, or cells, of mobile telephony networks, said devices being apt to read data transmitted onto said lines and to process said data to calculate and correlate specific operating parameters of the telephony network, said devices being further connected to central processing units to which they periodically transmit said pre-processed data for later searching and processing according to requirements of design and network maintenance or any other requirements of users connected by means of remote terminals to said central units.

According to the present invention, a method for monitoring the radioelectrical performance of mobile telephony networks consists of, by means of specific electronic devices,:
   simultaneously an continuously reading, and processing, all data transmitted on all digital data transmission lines between base stations controllers and base transmitting stations dedicated to single peripheral areas, or cells, said processing being useful to calculate network operating parameters and create statistical tables of events correlated to such parameters;
   periodically transmitting of said tables of data to central processing units for later searching and processing according to procedures stored into said central units or into remote processing terminals connected to said central units.

The advantages of the above described system and method are clear. Specific electronic devices included in the system of the invention are developed and realised according to the latest technologies to offer and distribute over the network the processing power needed to allow continuous and global monitoring of the network and to obtain the relating significant operating parameters in real time.

The devices' capability of synthesising network operating data into tables is useful to obtain a rapid alarm procedure against any significant bad working, directly active onto the whole net, and (to obtain), also, less overwork in the central processing units of the system.

Other significant advantages are related to the simplification of the procedure of performance checking of mobile telephony network, that descends from what disclosed above.

However, for a better understanding of the above-mentioned advantages and characteristics of the present invention, this will now be described by way of an embodiment example, with reference to the accompanying drawings, in which.

DESCRIPTION OF THE PREFERRED EMBODIMENT

Figure 1:
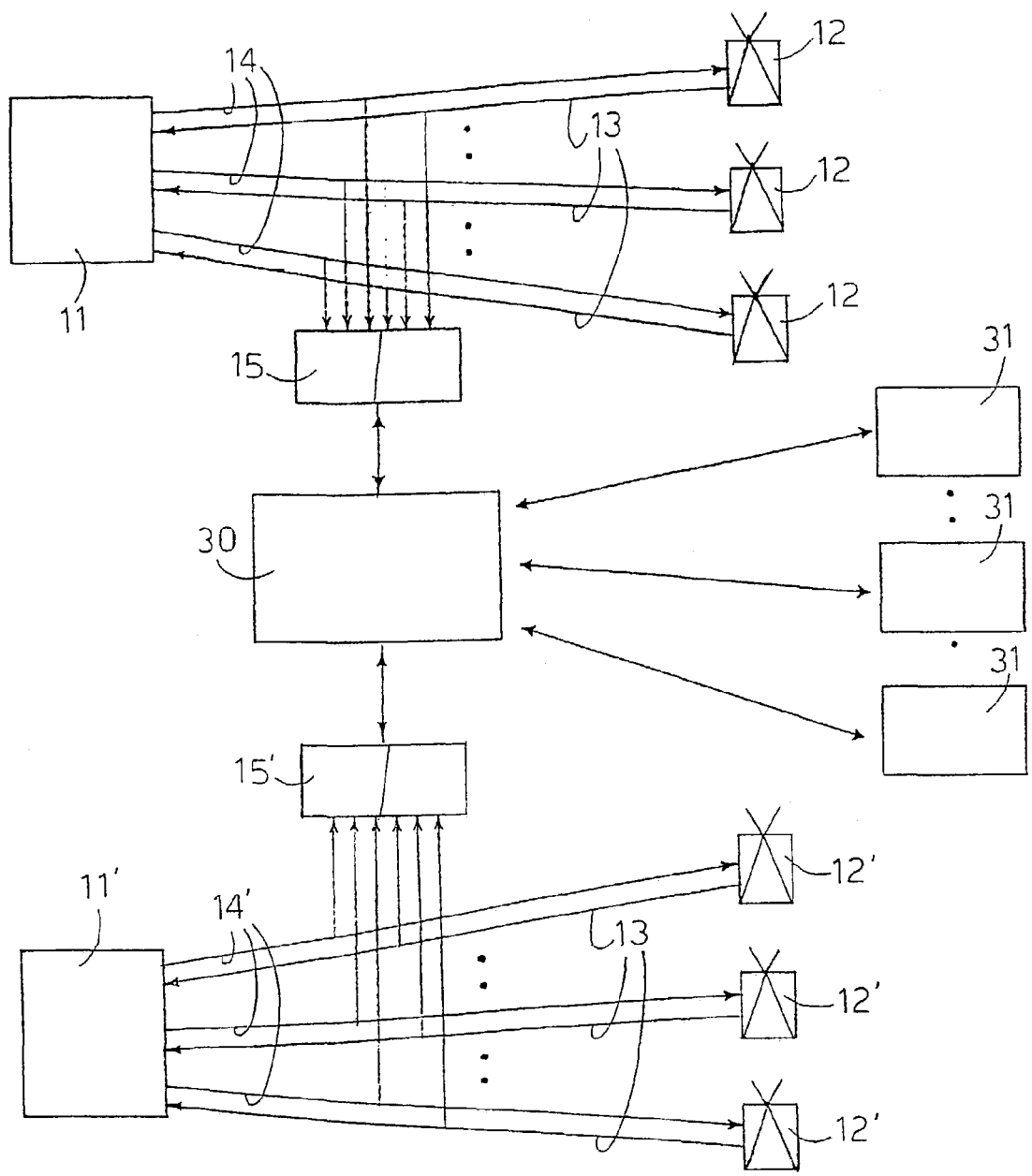
FIG. 1 shows a schematic view about distribution of components of a checking system on a mobile telephony network according to this invention.

In FIG. 1, a part of one mobile telephony network is schematically shown. It includes two stations controllers, 11, 11', so-named BSC (Base Station Controller) according to this technical field language.

Two groups of peripheral stations dedicated to single users areas, or cells, so-named BTS (Base Transmitting Station) and indicated by 12, 12', are supported by said stations controllers 11, 11'.

As it is known, a peripheral station of one mobile telephony network represents the radio station for all the mobile sets using that network included inside the cell, or geographic area, supported by said station. The task of said station consists in converting digital signals originated by the station controller (BSC) where it is connected to into radio signals and transmitting these radio signals to the mobiles active in its area of competence by using a frequency belonging to the frequency group assigned to that area. Obviously, the reverse is also performed by said station: radio signals originated by mobiles active in its own area are converted into digital signals and transmitted to the BSC.

It has to be noticed that radio signals from mobiles to peripheral station include not only signals regarding the active call, but also different technical signals, such as, for instance, level of reception active in the mobile location inside the area, data about transmission power and other technical service data.

A peripheral station 12, 12', transmits all the above data about all the mobiles currently active in its area to its station controller, 11, 11', adding, furthermore, technical data such as identification datum, error, rate in the radio communication of each mobile, and other data useful for network managing.

This group of digital data is serially transmitted by telephone lines, 13, 13', to stations controllers 11, 11', whereas, data relating to back voice messages and other technical data are serially transmitted by telephones lines 14, 14'.

One has to consider that the above digital transmissions are obviously performed according to a fixed communication protocol, and, particularly, this embodiment of the invention refers to the A-bis standard protocol.

On FIG. 1 there is a component, indicated by 15, non-intrusively connected to the transmission lines 13, 14; said component, located by the station controller, 11, is an electronic device dedicated to the analysis of the above data and, in particular, to the analysis and processing of data being transmitted on the transmission lines 13, 14 between the peripheral stations 12 and the station controller 11. As we said above, these data include technical information relating to network operating.

Figure 2:
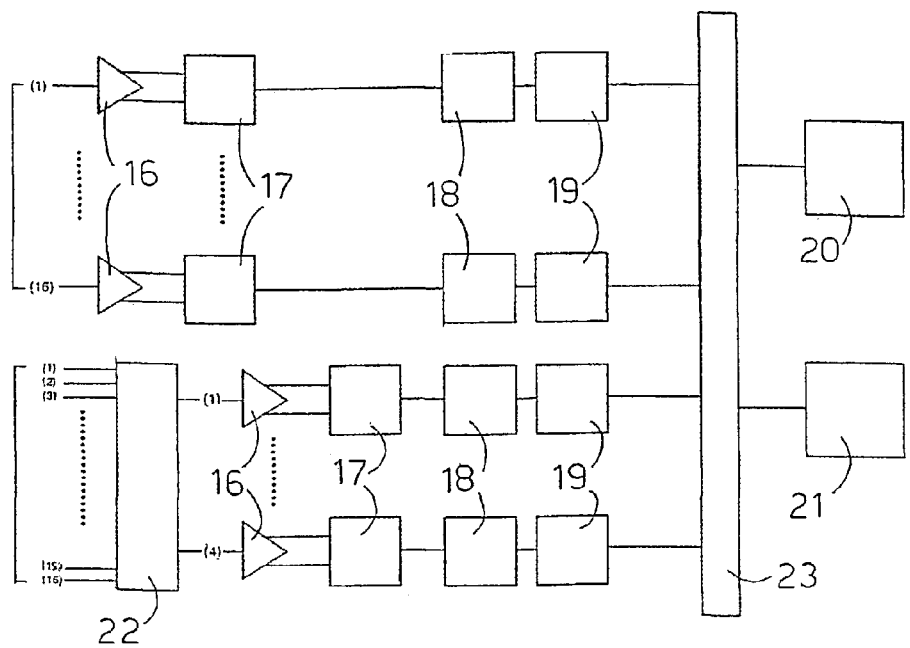
FIG. 2 shows a block diagram of one of the components of the system according to the invention.

As the flow-chart on FIG. 2 shows, the above device, 15, can be simultaneously connected to sixteen channels and it provides, for each channel,:

signal amplification and extraction of digital data, respectively by sections 16 and 17;

analysis of the structure of data net by dividing them into synchronised packages, by sections 18;

decoding the transmission protocol of each data package, detecting and extracting the message associated to the package and its parameters, by sections 19;

creation, for each type of message, of tables of events corresponding to each data package parameters, by section 20;

sending all the above data tables onto external processing unit, indicated by 30 on FIG. 1, by the section 21.

The electronic device 15, as it is shown on FIG. 2, performs the above operations relating both to data being transmitted onto the transmission channels, 13, from peripheral station, 12, to stations controllers, 11, and also to data being transmitted onto the transmission channels, 14, from stations controllers, 11, to peripheral station, 12. The second data group is acquired by the section 22 in subgroups composed of four channels, in order to optimise the device processing power and reduce its costs.

All data decoded by sections 19 are conveyed into the device internal bus 23, and, by this one, they reach the processing section, 20, and the external transmission interface 21.

Figure 3:
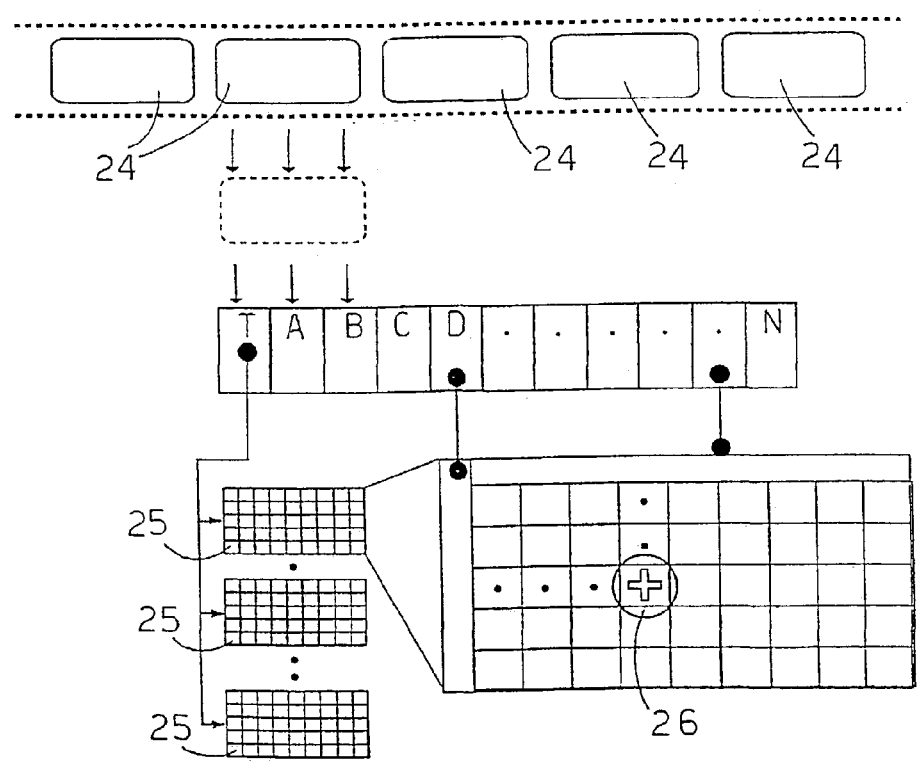
FIG. 3 shows a flow-chart relating to a method for monitoring the radioclectrical performance of mobile telephony networks according to the invention.

Data processing modalities of the device 15, by section 21, are clearly shown on FIG. 3.

FIG. 3 shows synchronised data packages, 24, reaching the processing section 20 by the internal bus 23. Here each data package is detected and analysed in order to define preliminarily the type of message, T, associated to the package and, then, the relating parameters A; B; . . . N. One must consider that any possible type of message is standardized: for instance, it could be the measure ratio MR, the channel request, CR, the transferring between contiguous cells, HC, or other messages; consequently, the relating technical service parameters would be: field level (RX Lev.), distance from radio station (TIME Adv.), level of reception quality (RX qual.), access delay (ACCESS Del.), and similar.

As it is schematically shown on FIG. 3, for each type of message T, one or more tables, 25, are created via software, by combining parameters included in the message in different ways; for instance, one of the tables can be created by using the distance parameter from the station as row variable and the field level as column variable, and each one of the significantly different values where the above quantities can be divided into are associated to each row and each column.

It is therefore possible to define and detect very fast any operating event to be monitored and analysed occurring in the network.

After creating the table, each of its cells will detect exactly a specific operating event, 26, composed by combination of the values of its row parameter and column parameter. Thus, when in one of the data packages, 24, the type of message corresponding to the above table is found, one of the cells of the table can be detected by using the values of the package whose parameters define that table as values of row and column, ad then, the number memorised in that cell must be increased by one unit, to mean that the detected event has occurred once again in the mobile telephony network under analysis. That cell will automatically show the number of times of occurrence of the event during a specific time gap, that is, it will be a statistical counter of that event.

One can easily understand that, according to the technique described above, it is possible to control completely any significant operating event of the network being occurred on any channel, in a very easy and fast way, even using a limited processing power.

This is valid even in case that one wants to monitor events caused by the correlation of a higher number of parameters.

Figure 4:
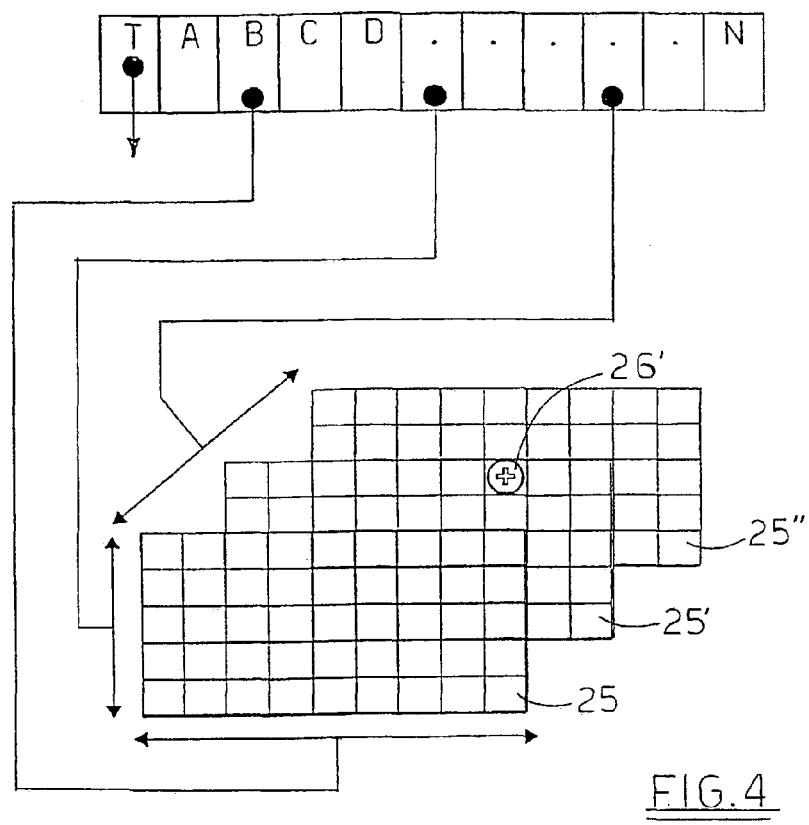
FIG. 4 shows a further flow-chart regarding the checking method of this invention.

As one can notice on FIG. 4, the event 26' is detected by the combination of three different parameters occurring in the same message, and this is obtained by a very easy logic operation, that is, by creating a group of analogous tables instead of a single table, where each table is detected by the third parameter's different values.

The above described way of collecting network operating data is very efficient; in fact, by small processing activity it is possible to get evolved databasis ready to be stored into centralised files and apt to provide a direct and sufficiently wide view of any phenomena by simple search operations. One must notice that a single table will include and abstract statistical data relating to a good 16 different users cells or areas relating to the same station controller 11, therefore all the events statistically stored in a table are originated by a sufficiently wide and significant area of the network.

Obviously, it has to be considered that, in each single electronic device, 15, the number of storable tables is limited by the necessary limited memory capacity of the device; so, the tables created in each device are regularly transferred into external memory units supporting several network stations controllers, 11.

It is clear therefore that, after that the tables are transferred and memorised into the central units, 30, wide and global information can be computed, relating both to the geographic area and to the time gap interested, and it is also clear that such information can be transformed in order to be interpreted in a more direct way.

Figure 5:
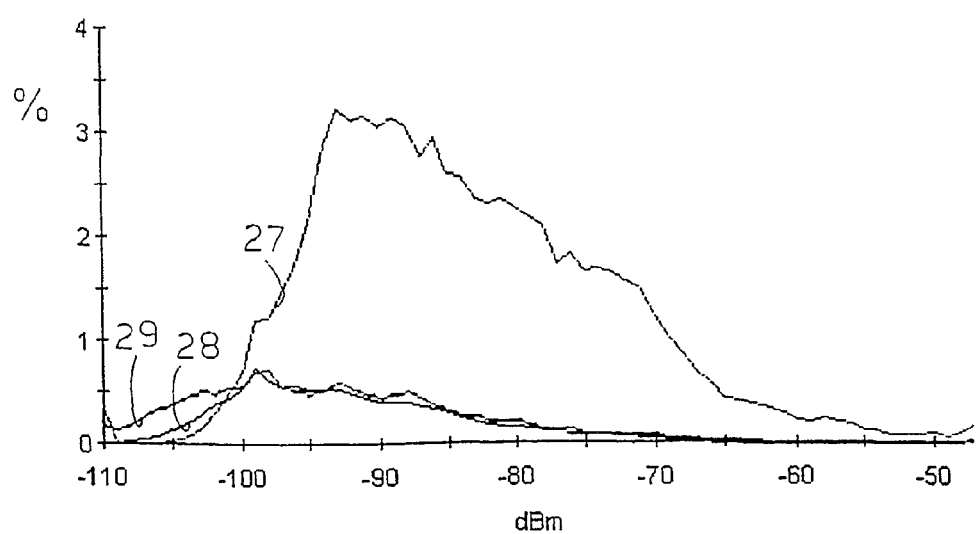
FIG. 5 shows variation curves of some of the operating parameters of mobile telephony network as detected and processed according to the system of this invention.

For instance, FIG. 5 shows variation curves originated by processing data tables stored into the central unit 30, performed according to a procedure located in the remote working terminals, 31, connected to the central unit by telematic lines. The variation curves sum up in a very understandable way events collected in tables analogous to those of FIG. 3; in detail, all the correspondent cells of analogous tables arrived into the unit 30 at different times have been additioned to cover a sufficiently wide time gap, by one of the devices 15 connected, for data regarding a specific cell or area of the network.

In this case, the field level (varying from –110 to –50 decibel/milliwatt) and quality level of communication are analysed as parameters; in particular, the quality level of communication has been fixed according to three different values, and exactly: first value showing good quality, second value showing middling quality, and third value showing scarce quality. Data relating to these three values of quality level have been respectively shown on FIG. 5 by the 27, 28, 29 curves and, for easy reading, for each of them the percentage weight has been computed and interpolation of contiguous values has been performed to compose continuos curves, allowing easy interpretation.

As it is already clear from the description above, network operating parameters can be correlated in different ways according to different requirements, such as those of maintenance or design of future expansion or upgrading the network. Characteristics and advantages above described are however save, as well as in case of modifications and changes to what ha been disclosed by way of example.

For instance, the number of channels simultaneously monitored by a single electronic device, 15, can be changed, or decoding transmission protocol can be varied in case that this comply with different standards from those in use.

The described method for quality check can be however performed by using devices structured according to drawing on FIG. 2 or by analogous devices able to perform a pre-processing of operating data being transmitted onto the network digital transmission lines.

Obviously, other modifications to what described and shown may be carried out, within the limits of the invention as defined in the appended claims.

The invention claimed is:

1. A system for monitoring the radioelectrical performance of a mobile telephony network; comprising:
   a base transmitting station;
   a base station controller;
   digital data transmission lines connecting the base station controller to said base transmitting station; and
   an electronic device constructed and arranged to read data being transmitted by said digital data transmission lines in both directions between said base station controller and said base transmitting station and to process said data to calculate and correlate specific operating parameters of said telephony network, said process including:
   analyzing the structure of said data by dividing said data into synchronized packages;
   decoding a transmission protocol of each data package;
   detecting and extracting a message associated with a data package and its parameters;
   creating for each type of message tables of events corresponding to data package parameters; and
   sending the tables to an external processing unit.

2. A system according to claim 1 further comprising a central processing unit which periodically receives said tables of statistics for later searching and processing activities performed according to requirements of design and network maintenance or any other requirements of users connected by means of local or remote terminals to said central processing unit.

3. A system according to claim 1 wherein said electronic device comprises:
   sections dedicated to amplification of electric signals transmitted on said lines and to extraction of digital data from said signals;
   sections dedicated to analyze the structure of said data and to divide them into said synchronized packages;
   sections dedicated to decode the transmission protocol of each data package, and to detect and extract the message associated to the package and its parameters;
   a section dedicated to creation, for each type of extracted message, of tables of events corresponding to each data package parameters; and
   a section dedicated to send all data tables to an external processing unit.

4. A system according to claim 1 wherein said electronic device is constructed and arranged to read and process simultaneously data transmitted on at least sixteen lines of said digital data transmission lines flowing in both directions between said base transmitting station and said base station controller.

5. A system according to claim 1 wherein said electronic device is located in proximity to said base station controller.

6. A system according to claim 2 wherein said electronic device is constructed and arranged to read and process simultaneously data transmitted on at least sixteen lines of said digital data transmission lines, flowing in both directions between said base transmitting station and said base station controller.

7. A system according to claim 2 wherein said electronic device is located in proximity to said controller.

8. A system according to claim 3 wherein said electronic device is located in proximity to said controller.

9. A system according to claim 4 wherein said electronic device is located in proximity to said controller.

10. A system according to claim 6 wherein said electronic device is located in proximity to said controller.

11. A method for monitoring the radjoelectrical performance of mobile telephony network comprising:

simultaneously and continuously reading data transmitted on all digital data transmission lines between a base station controller and base transmitting stations of said mobile telephony network;

processing said data in order to calculate and correlate specific operating parameters of said telephony network, said processing including:

analyzing the structure of said data by dividing said data into synchronized packages;

decoding a transmission protocol of each data package;

detecting and extracting a message associated with a data package and its parameters; and creating for each type of message tables of events corresponding to data package parameters; and periodically transmitting data resulting from said processing to a central processing unit for further processing.

12. A method according to claim 11 wherein tables of statistics of events resulting from the correlation of network operating parameters are created in said processing step.

13. A method according to claim 11 wherein said processing is carried out by an electronic device located in proximity to said controller.

* * * * *